F. A. JOHNSON.
LOCK.
APPLICATION FILED APR. 29, 1918.
1,296,085.
Patented Mar. 4, 1919.
2 SHEETS—SHEET 2.
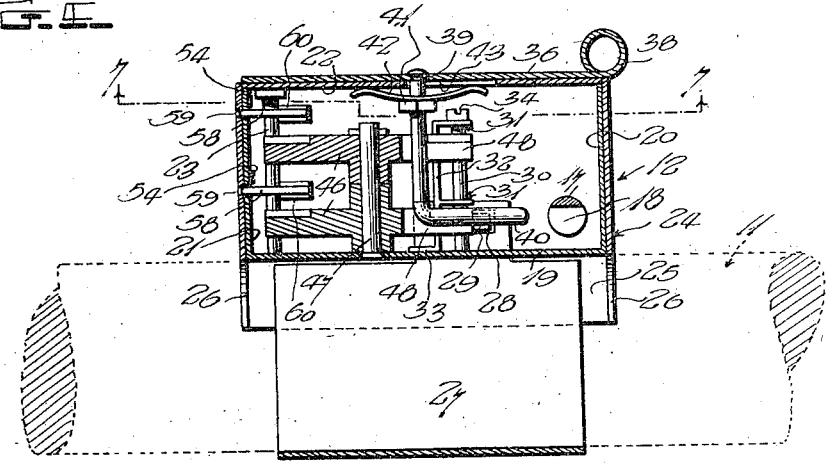
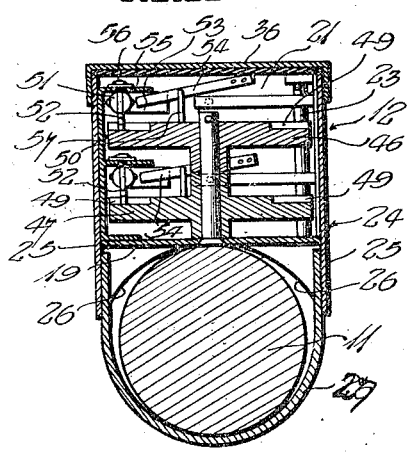
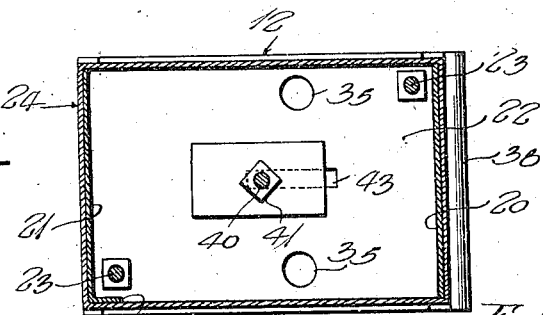
Witness
H. Woodard
Inventor
F. A. Johnson
By [signature]
Attorneys

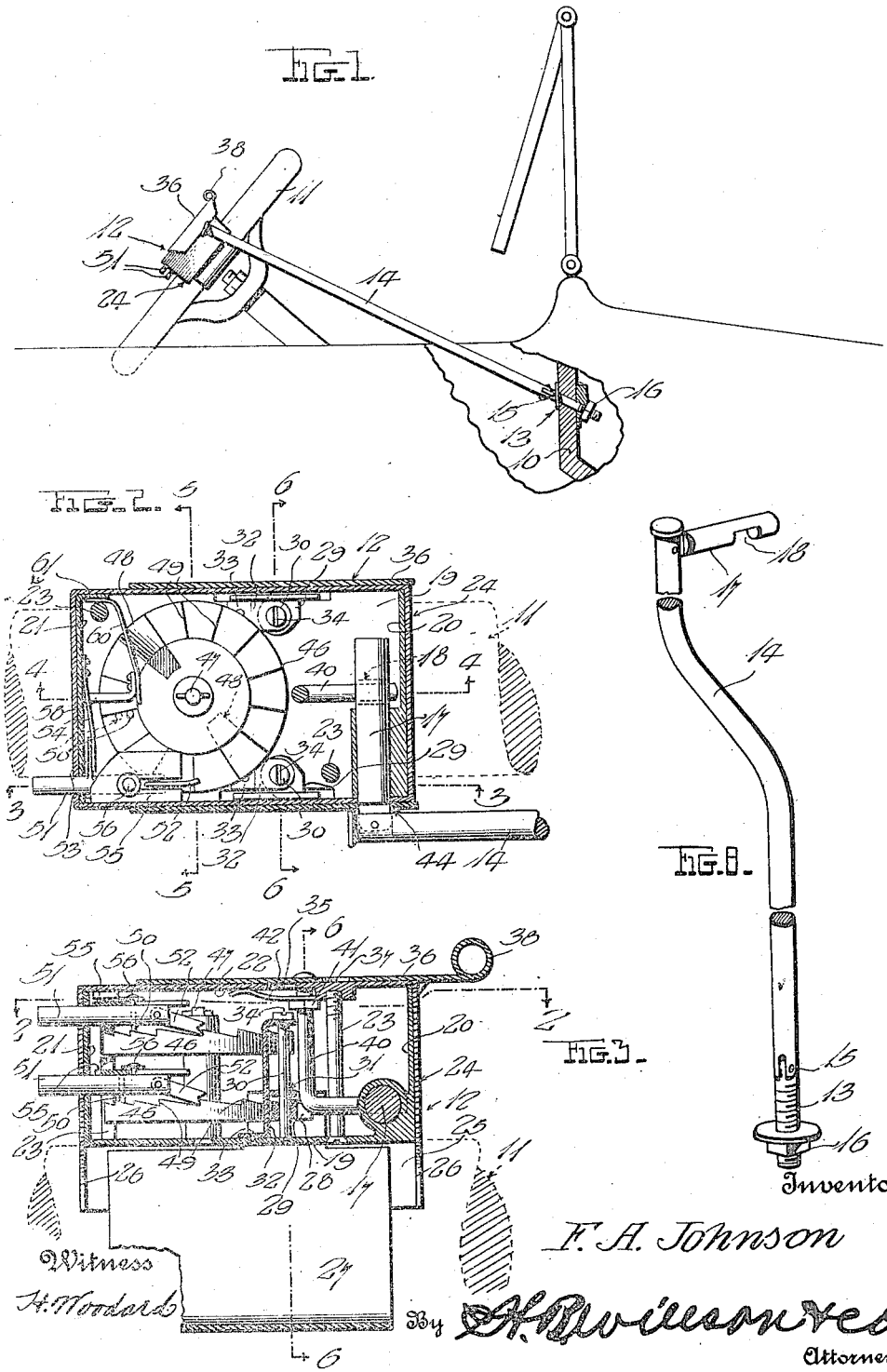

UNITED STATES PATENT OFFICE.

FRANK A. JOHNSON, OF DANVILLE, ILLINOIS.

LOCK.

1,296,085.  Specification of Letters Patent.  Patented Mar. 4, 1919.

Application filed April 29, 1918. Serial No. 231,517.

*To all whom it may concern:*

Be it known that I, FRANK A. JOHNSON, a citizen of the United States, residing at Danville, in the county of Vermilion and State of Illinois, have invented certain new and useful Improvements in Locks; and I do declare the following to be a full, clear, and exact description of the invention, such as will enable others skilled in the art to which it appertains to make and use the same.

This invention relates to locks, and it relates more particularly to an improved keyless lock for automobiles.

One object of this invention is to provide an improved keyless or combination lock whereby the steering wheel of an automobile may be securely locked, and may be quickly unlocked only by a person having a knowledge of the combination;

Another object is to provide a lock of this character which may be bodily detached when desired, but secured against detachment by a person not having knowledge of the combination;

Another object is to provide a lock of this character having a starting-point indicator that is automatically and alternately moved into and out of tangible position, so that the lock can be manipulated as well in the dark as in the light;

Another object is to provide a lock of this character which is compact, strong, durable, convenient, thoroughly practical, and which may be manufactured at a comparatively slight cost.

Other objects and advantages may become apparent to persons who read the following details of description in connection with the accompanying drawings, in which:

Figure 1 is a side elevation illustrating a fragment of an automobile having my improved keyless lock in its operative position thereon;

Fig. 2 is an enlarged sectional view, the section being taken substantially along the line 2—2 of Fig. 3;

Fig. 3 is a sectional view taken substantially along the line 3—3 of Fig. 2, a portion being broken away;

Fig. 4 is a sectional view taken substantially along the line 4—4 of Fig. 2;

Fig. 5 is a transverse sectional view, the section being taken substantially along the line 5—5 of Fig. 2;

Fig. 6 is a transverse sectional view taken along the line 6—6 of Figs. 2 and 3;

Fig. 7 is a sectional view taken along the line 7—7 of Fig. 4; and

Fig. 8 is a perspective view illustrating the means for connecting the body of the lock with the dashboard of the automobile.

Referring to these drawings in detail, in which similar reference characters correspond with similar parts throughout the several views, the dashboard 10 and steering wheel 11 of the automobile are shown merely to illustrate the application of my improved locking device, it is to be understood that the latter is capable of application in connection with other elements of an automobile or of any other object having relatively movable parts that are to be locked in immovable relation to one another.

Referring to Figs. 1 and 8, it will be seen that this locking device consists broadly of a steering-wheel attachment 12, a dashboard attachment 13 and a rigid connection or link 14. The link 14 may be either hollow or solid and is pivotally connected at 15 to the screw-threaded attachment 13, the latter being provided with a nut 16 which may be held on the attachment 13 by any appropriate means so as to secure the attachment 13 in place. The link 14 may be swung on its pivot into and out of connection with the body 12, and an arm or stud 17 extends laterally from one end of the link 14 and is provided with a notch 18. The steering-wheel attachment 12 comprises a body or frame which preferably consists of a lower plate 19 having upstanding ends 20 and 21, and an upper plate 22, these plates being secured together by means of screws 23 so as to form a housing in which is supported a portion of the locking mechanism presently to be described.

An open frame 24 surrounds the housing so as to close the previously open sides thereof, and this frame or outer housing 24 is provided with flanges or extensions 25 which are connected by arcuate edges 26 which are adapted to fit about the convexed surface of the steering wheel 11 as indicated in Figs. 5 and 6. It will be seen, however, that the arc of each edge 26 is somewhat greater than that of the steering-wheel section, and that it is adapted to be fitted to steering wheels of greater or less diameter in cross section.

A sheet metal securing element 27 is provided with apertures 28 which engage with securing elements 29 for securing the curved securing member or element 27 in locked engagement with the body which consists of the elements 19 to 22 inclusive. The securing elements 29 are each secured on a pintle or shaft 30, and these shafts are each pivotally connected at 31 to a supporting bracket 32. These supporting brackets are secured at 33 to the plate 19 and one end of each shaft 30 is supported by the plate 19 so as to prevent movement of the shafts 30 toward said plate. A notch or slot 34 may be provided in the other end of each shaft 30. The plate 22 is provided with apertures 35 through which a key or other instrument may be inserted for engaging the notch 34 so at to turn the shafts 30 and thereby move the securing elements 29 out of engagement with the notches 28; and it will be seen from the foregoing that the securing member 27 may be quickly and easily united and disunited with the body of the lock. However, it is desirable that the shafts 30 be rendered inoperable or inaccessible at times, so that the lock may be removed from the steering wheel by an authorized person only and, therefore, I provide a plate 36 which has apertures 37 that are movable into and out of registry with the apertures 35, and it is obvious that when these apertures are out of registry, the shafts are inaccessible and inoperable.

The plate 36 is provided with a handle or manipulative element 38 whereby it may be moved from the position shown in Fig. 3 to the position shown in Fig. 4 and vice versa, and this plate is apertured at 39 for the reception of an arm or L-shaped locking element 40. A nut or shoulder 41 is provided on the element 40, and a spring 42 is seated thereon and bears against the lower surface of the plate 22. The upper portion of the arm 40 is slidable along a slot 43 in the plate 22, and the ends of this shoulder limit the movements of the plate 36 and the arm 40.

The lower end of the arm 40 is parallel with the plate 36, so that this lower end is moved longitudinally when the plate 36 is moved. The arm 17 of the link 14 extends into an aperture 44 of the lock-body or casing, and the notch 18 receives the lower end of the arm 40 when the latter is in its operative position, and it will be seen that the arm 40 now prevents disengagement of the arm 17 from the body or casing. However, when the arm 40 is in its inoperative position shown in Fig. 4, the arm 17 may be moved longitudinally out of the aperture or seat 44, a pivot joint being provided at the junction of the arm 17 with the links 14, to allow such movement. In order that the elements 36 and 40 may be interfered with so as to prevent their movement from the operative or effective position to the inoperative or ineffectual position, I provide one or more rotary tumblers or interfering elements 46 which are mounted to rotate on a shaft 47 which extends upward from the plate 19 and is secured thereto. Each of the tumblers 46 is provided with a radial notch 48, a series of ridges or teeth 49 and a pin or stud 50. For the purpose of rotating each of these tumblers 46, I provide a plunger or pusher 51, these pushers being slidable through alined apertures or bearings in the lock-casing. Upon each pusher 51 is provided a pawl 52 which is engaged with the teeth 49 on the corresponding tumbler. An arm 53 extends laterally from each pusher 51, and a spring 54 engages with each arm 53 for returning the pushers after they have been pushed inward, these springs being suitably secured to the upturned portion 21. Suitable guides 55 coöperate with studs 56 on the pushers to guide the latter rectilinearly, these guides being supported by a bracket 57 which extends upward from the plate 19. By means of these pushers 51, the tumblers 46 may be rotated step-by-step so as to bring the notches 48 into the path of movement of the arm 40, so that the latter may be moved to its inoperative position, and the apertures 35 and 37 may be brought into registry.

Because of the inner and outer housings completely concealing the tumblers and the arm 40, it is impossible to detect them by the sense of sight when the notches 48 are in position to receive the arm 40. Therefore it is necessary that an indicating means be provided. Such indicating means may preferably consist of a feeler for each of the tumblers 48 and means for moving the feeler into and out of a tangible position. In the present instance, each feeler consists of a pin or stud 58 which is movable inward and outward through alined apertures 59 in the inner and outer casing. Each element 58 is secured to a spring 60 which normally holds the feeler in the intangible position shown in Fig. 2, each spring 60 being secured to a flange 61 formed on the upstanding portion 21. The pin 50 of each tumbler 46 presses the corresponding spring 60 so as to move the feeler outward, and then releases the spring so that it draws the feeler inward. The operation of this lock is as follows:

Assuming that the attachment 12 is secured on the wheel 11, and the attachment 13 is secured to the dashboard or to some other fixed or stationary object, the parts of the attachment 12 being in the position shown in Fig. 4, the arm 17 is now pushed into the aperture 44, the manipulative element 38 is moved so as to shift the plate 36 and arm 40 into the position shown in Fig. 3, and one or both of the pushers 31 are pushed so as to bring one or both of the notches 48 out of the path of the arm 40, so that the latter is blocked or interfered with to prevent it from being moved out of its effective position until the notches 48 are again brought into the path of the arm 40. Now, the wheel 11 is locked against turning; as shown in Fig. 1, and the locking or securing means 27—29—30 is rendered inaccessible because of the apertures 35 and 37 being out of registry. When it is desired to unlock the wheel 11, the pushers 51 are repeatedly operated until the pins or studs 58 have moved to the tangible position and retreated to the intangible position, thus indicating that the tumblers 46 are at the starting point; that is, at the point from which the combination is based or started: For instance, assuming that the upper-pin 50 is set so that when it leaves the spring 60, the upper plunger 51 must be operated nine times to bring the notch 48 of the upper tumbler into the path of the arm 40, and the lower pin 50 is set so that the lower pusher 51 must be actuated twice in order to bring the notch 48 of the lower tumbler into the path of the arm 40; it will be seen that the combination equals 92 and that a great number of combinations may be obtained by placing the pins 50 at different points on the tumblers; also that the number of tumblers and pushers may be increased so as to make the scope of the combination still greater.

From the foregoing, it will be seen that I have provided a lock of great merit and which is fully capable of attaining the foregoing objects.

Although I have described this embodiment of my invention very specifically, it is not intended to limit this invention to these exact details of construction or arrangement of parts, but I am entitled to make changes within the scope of the foregoing description and following claims.

What I claim as my invention is:

1. In a lock, a body, means operable to secure said body to and release it from a movable object, means to connect said body to and release it from an external object so as to prevent movement of said movable object with relation to said external object, a device including a handle by which it is operable to render the first and second said means incapable of being operated, and interfering means to render the said handle incapable of being operated.

2. In a lock, the combination of a body, means operable to secure said body to and release it from a movable object, means to connect said body to and release it from an external object and thus prevent movement of said movable object with relation to said external object, a manipulative device movable to a position to simultaneously render the first and second said means incapable of being operated, and a permutation device movable from a predetermined starting position in which it prevents operation of said manipulative device to a position in which it permits operation of said manipulative device.

3. In a lock, the combination of a body, means operable to secure said body to and release it from a movable object, means to connect said body to and release it from an external object and thus prevent movement of said movable object with relation to said external object, a manipulative device movable to a position that simultaneously renders the first and second said means incapable of being operated, a permutation device movable from a predetermined starting position in which it prevents operation of said manipulative device to a position in which it permits operation of said manipulative device, and indicating means for indicating when the said permutation device is at said starting position.

4. A lock comprising a movable element, interfering means rotatable from a predetermined interfering position to a non-interfering position with respect to said movable element, indicating means movable to and from a tangible position so as to indicate through the sense of feeling when said interfering means is at said predetermined position, and means coöperative with said interfering means for controlling said indicating means.

5. In a lock, a hollow body, a member having a portion insertible into said hollow body so as to combine with the latter for embracing an external object, a securing element in said hollow body and movable into and out of locking engagement with said member, a connecting element comprising a portion insertible in and removable from the hollow body for connecting the latter to another external object, and a device mounted on and extending into said hollow body and being operable to prevent operation of said securing element and to prevent removal of said connecting element from its connection with said hollow body.

6. In a lock, a hollow body, a member having a portion insertible into said hollow body so as to combine with the latter for embracing an external object, a securing element in said hollow body and movable into and out of locking engagement with said member, a connecting element comprising a portion insertible in and removable from the hollow body for connecting the latter to another external object, a manipulative element mounted on said hollow body and being operable to render said securing element inaccessible, and a locking device operable by said manipulative element to effect the locking of said connecting element in its connection with said hollow body.

7. In a lock, a hollow body, a member having a portion insertible into said hollow body so as to combine with the latter for embracing an external object, a securing element in said hollow body and movable into and out of locking engagement with said member, a connecting element comprising a portion insertible in and removable from the hollow body for connecting the latter to another external object, a manipulative element mounted on said hollow body and being operable to render said securing element inaccessible, a locking device operable by said manipulative element to effect the locking of said connecting element in its connection with said hollow body, and an interfering device in said hollow body and being operable to prevent the operation of said locking device.

8. In a lock, a hollow body, a member having a portion insertible into said hollow body so as to combine with the latter for embracing an external object, a securing element in said hollow body and movable into and out of locking engagement with said member, a connecting element comprising a portion insertible in and removable from the hollow body for connecting the latter to another external object, a manipulative element mounted on said hollow body and being operable to render said securing element inaccessible, a locking device operable by said manipulative element to effect the locking of said connecting element in its connection with said hollow body, an interfering device in said hollow body and being adapted for movement into and out of position to interfere with the operation of said locking device, and an indicator shiftable by the movement of said interfering device and being effective to indicate when said interfering means is in the non-interfering position.

9. In a lock, a hollow body, a member having a portion insertible into said hollow body so as to combine with the latter for embracing an external object, a securing element in said hollow body and movable into and out of locking engagement with said member, a connecting element comprising a portion insertible in and removable from the hollow body for connecting the latter to another external object, a manipulative element mounted on said hollow body and being operable to render said securing element inaccessible, a locking device operable by said manipulative element to effect the locking of said connecting element in its connection with said hollow body, an interfering device in said hollow body and being adapted for rotary movement into and out of position to interfere with the operation of said locking device, and an indicator operable by the rotation of said interfering device and being effective to indicate by the sense of touch when said interfering device is in the non-interfering position.

In testimony whereof I have hereunto set my hand in the presence of two subscribing witnesses.

FRANK A. JOHNSON.

Witnesses:
  WILLIAM BIRD,
  MARY BIRD.